US007747481B2

(12) United States Patent
Notani et al.

(10) Patent No.: US 7,747,481 B2
(45) Date of Patent: *Jun. 29, 2010

(54) EXTREME CAPACITY MANAGEMENT IN AN ELECTRONIC MARKETPLACE ENVIRONMENT

(75) Inventors: Ranjit N. Notani, Irving, TX (US); Vinatha Chaturvedi, Coppell, TX (US); Vinayak S. Ghaisas, Irving, TX (US); Harsha Chaturvedi, Coppell, TX (US)

(73) Assignee: i2 Technologies US, Inc., Dallas, TX (US)

( * ) Notice: Subject to any disclaimer, the term of this patent is extended or adjusted under 35 U.S.C. 154(b) by 117 days.

This patent is subject to a terminal disclaimer.

(21) Appl. No.: 11/751,348

(22) Filed: May 21, 2007

(65) Prior Publication Data

US 2007/0214067 A1    Sep. 13, 2007

Related U.S. Application Data

(62) Division of application No. 09/841,320, filed on Apr. 23, 2001, now Pat. No. 7,370,009.

(60) Provisional application No. 60/238,307, filed on Oct. 5, 2000.

(51) Int. Cl.
*G06Q 10/00* (2006.01)
(52) U.S. Cl. ............................ 705/28; 705/50; 705/1
(58) Field of Classification Search ............... 705/28, 705/1, 50
See application file for complete search history.

(56) References Cited

U.S. PATENT DOCUMENTS

| 4,996,642 | A | 2/1991 | Hey |
| 5,041,972 | A | 8/1991 | Frost |
| 5,237,496 | A | 8/1993 | Kagami et al. |

(Continued)

FOREIGN PATENT DOCUMENTS

JP    0 463 616 A2    2/1992

(Continued)

OTHER PUBLICATIONS

Chopra, Sunil and Meindl, Peter; Supply Chain Management, Strategy, Planning, & Operation, Prentice-Hall, Inc., Oct. 10, 2000.

(Continued)

*Primary Examiner*—Pierre E Elisca
(74) *Attorney, Agent, or Firm*—Booth Udall, PLC; Steven J. Laureanti

(57) ABSTRACT

A system (10) for managing a capacity extreme at a first entity (12) in a supply chain includes a planning application (36) that receives status data for at least the first entity (12) reflecting the capacity extreme at the first entity (12) and generates a plan (34) according to the status data. A manager application (44) receives the plan (34) and, according to the plan (34), automatically initiates at least one service in an attempt to resolve at least a portion of the capacity extreme through interaction with one or more other entities (12). The manager application (44) selects the service from among a plurality of available services based on a monetary value to the first entity (12) of a resolution expected to be available using the selected service relative to other services.

30 Claims, 3 Drawing Sheets

U.S. PATENT DOCUMENTS

| | | | |
|---|---|---|---|
| 5,305,199 | A | 4/1994 | LoBiondo et al. |
| 5,321,833 | A | 6/1994 | Chang et al. |
| 5,590,197 | A | 12/1996 | Chen et al. |
| 5,712,989 | A | 1/1998 | Johnson et al. |
| 5,715,444 | A | 2/1998 | Danish et al. |
| 5,734,890 | A | 3/1998 | Case et al. |
| 5,765,143 | A | 6/1998 | Sheldon et al. |
| 5,819,245 | A | 10/1998 | Peterson et al. |
| 5,835,087 | A | 11/1998 | Herz et al. |
| 5,867,799 | A | 2/1999 | Lang et al. |
| 5,884,282 | A | 3/1999 | Robinson |
| 5,903,892 | A | 5/1999 | Hoffert et al. |
| 5,909,023 | A | 6/1999 | Ono et al. |
| 5,918,014 | A | 6/1999 | Robinson |
| 5,918,223 | A | 6/1999 | Blum et al. |
| 5,960,414 | A | 9/1999 | Rand et al. |
| 5,963,920 | A | 10/1999 | Rose et al. |
| 5,963,948 | A | 10/1999 | Shilcrat |
| 5,983,220 | A | 11/1999 | Schmitt |
| 6,009,407 | A | 12/1999 | Garg |
| 6,012,051 | A | 1/2000 | Sammon, Jr. et al. |
| 6,018,738 | A | 1/2000 | Breese et al. |
| 6,049,777 | A | 4/2000 | Sheena et al. |
| 6,055,519 | A | 4/2000 | Kennedy et al. |
| 6,064,980 | A | 5/2000 | Jacobi et al. |
| 6,076,067 | A | 6/2000 | Jacobs et al. |
| 6,115,690 | A | 9/2000 | Wong |
| 6,151,582 | A * | 11/2000 | Huang et al. .................. 705/8 |
| 6,167,380 | A | 12/2000 | Kennedy et al. |
| 6,188,989 | B1 | 2/2001 | Kennedy |
| 6,195,652 | B1 | 2/2001 | Fish |
| 6,249,774 | B1 | 6/2001 | Roden et al. |
| 6,266,649 | B1 | 7/2001 | Linden et al. |
| 6,266,652 | B1 | 7/2001 | Godin et al. |
| 6,286,005 | B1 | 9/2001 | Cannon |
| 6,321,133 | B1 | 11/2001 | Smirnov et al. |
| 6,324,522 | B2 | 11/2001 | Peterson et al. |
| 6,360,227 | B1 | 3/2002 | Aggarwal et al. |
| 6,486,899 | B1 | 11/2002 | Bush, Jr. |
| 6,523,026 | B1 | 2/2003 | Gillis |
| 6,577,304 | B1 | 6/2003 | Yablonski et al. |
| 6,584,370 | B2 | 6/2003 | Denton et al. |
| 6,606,744 | B1 | 8/2003 | Mikurak |
| 6,671,673 | B1 | 12/2003 | Baseman et al. |
| 6,889,197 | B2 | 5/2005 | Lidow |
| 6,947,905 | B1 | 9/2005 | Starr et al. |
| 6,954,736 | B2 | 10/2005 | Menninger et al. |
| 6,963,847 | B1 | 11/2005 | Kennedy et al. |
| 6,963,849 | B1 * | 11/2005 | Chaturvedi et al. ............ 705/10 |
| 6,970,841 | B1 | 11/2005 | Cheng et al. |
| 7,003,474 | B2 | 2/2006 | Lidow |
| 7,024,265 | B2 | 4/2006 | Walser et al. |
| 2001/0034673 | A1 * | 10/2001 | Yang et al. ..................... 705/28 |
| 2001/0039514 | A1 * | 11/2001 | Barenbaum et al. ........... 705/14 |
| 2002/0099612 | A1 * | 7/2002 | Seaman et al. ................. 705/26 |
| 2008/0052149 | A1 * | 2/2008 | Fischer et al. ................. 705/10 |

FOREIGN PATENT DOCUMENTS

| | | | |
|---|---|---|---|
| JP | 2003203163 A * | 7/2003 | |
| JP | 2006011637 | 1/2006 | |
| WO | WO 96/12238 | 4/1996 | |
| WO | WO 97/02537 | 1/1997 | |

OTHER PUBLICATIONS

Bragg, Steven M., Accounting Best Practices, John Wiley and Sons, Inc., 1999.

Muller, Nathan J., Desktop Encyclopedia of the Internet, Artech House, Inc., 1998.

Hirschey, Mark and Pappas, James L., Managerial Economics, 8th Ed., The Dryden Press, Fort Worth, TX, 1996.

Greene, James H., Editor-in-Chief, Production and Inventory Control Handbook, 3rd Ed., The McGraw-Hill Companies, Inc., 1997.

Dobler, Donald W. and Burt, David N., Purchasing and Supply Management, Text & Cases, 6th Ed. The McGraw-Hill Companies, Inc., 1996.

Brigham, Eugene F. and Gapenski, Louis C., Financial Management, Theory & Practice, 7th Ed., The Dryden Press, Harcourt Brace & Co., 1994.

Taylor, Bernard W., III, Introduction to Management Science, 5th Ed., Prentice-Hall, Inc., NJ, 1996.

Poirier, Charles C., et al., E-Supply Chain, Using the Internet to Revolutionize Your Business, Berrett-Koehler Publisher, Inc., 2000.

Horngren, Charles T. and Sundem, Gary L., Introduction to Financial Accounting, Revised 3rd Ed., Prentice-Hall, Inc., 1988.

Borland's Paradox for Windows User's Guide, Borland International, Inc., 1994.

Riley, David D., Data Abstraction and Structure, An Introduction to Computer Science II, Boyd and Fraser Publishing Company, 1987.

Gavron, Jacquelyn, et al., How to Use Microsoft Windows NT 4 Workstation, Macmillian Computer Publishing, USA, 1996.

White, Ron, How Computers Work, Millennium Ed. Que Corporation, Sep. 1999.

Derfler, Frank J. et al., How Networks Work, Millennium Ed. Que Corporation, Jan. 2000.

Gralla, Preston, How the Internet Works, Millennium Ed. Que Corporation, Aug. 1999.

Unknown, "Sellers Flock to OutletZoo.com as New Automatic Price Drop Method Moves Excess Inventory Online", Business Wire, Dialog(R) File 610: Business Wire, 2 pages, Oct. 25, 1999.

Unknown, "OpenSite Technologies, Inc. Helps AOL Raise $100,000 With Online Charity Auction", Business Wire, Dialog(R) File 621: Gale Group New Prod. Annour. (R), 1 page, Jan. 6, 1999.

Unknown, "News Briefs", Interactive PR & Marketing News, v4, n31, Dialog(R) File 636: Gale Group Newsletter DB (TM), Sep. 19, 1997.

Funaki, et al., "Method and System for Production Planning Transaction", JP02001331693A, East Version 1.03.0002, 58 pages, Apr. 9, 2002.

PCT/US01/31317, PCT Notification of Transmittal of the International Search Report or the Declaration, 5 pages, Feb. 13, 2002.

PCT/US01/31212, PCT Notification of Transmittal of the International Search Report or the Declaration, 3 pages, Feb. 13, 2002.

PCT/US01/31721, PCT Notification of Transmittal of the International Search Report or the Declaration, 3 pages, Jan. 17, 2002.

PCT/US01/31213, PCT Notification of Transmittal of the International Search Report or the Declaration, 6 pages, Jan. 23, 2002.

PCT/US00/16774, PCT Notification of Transmittal of the International Search Report or the Declaration, 7 pages, Feb. 6, 2002.

PCT/US01/31424, PCT Transmittal of the International Search Report or the Declaration, 3 pages, Aug. 29, 2002.

PCT/US01/31338, PCT Transmittal of the International Search Report or the Declaration, 4 pages, May 14, 2002.

N. Tenorio, "System and Method for Retrieving Information According to Improved Matching Criteria", U.S. Appl. No. 09/742,851, filed Dec. 20, 2000.

N. Tenorio, "System and Method for Negotiating According to Improved Matching Criteria", U.S. Appl. No. 09/750,617, filed Dec. 20, 2000.

S. Iyer, et al., "Product Substitution Search Method", U.S. Appl. No. 09/594,652, filed Jun. 15, 2000.

* cited by examiner

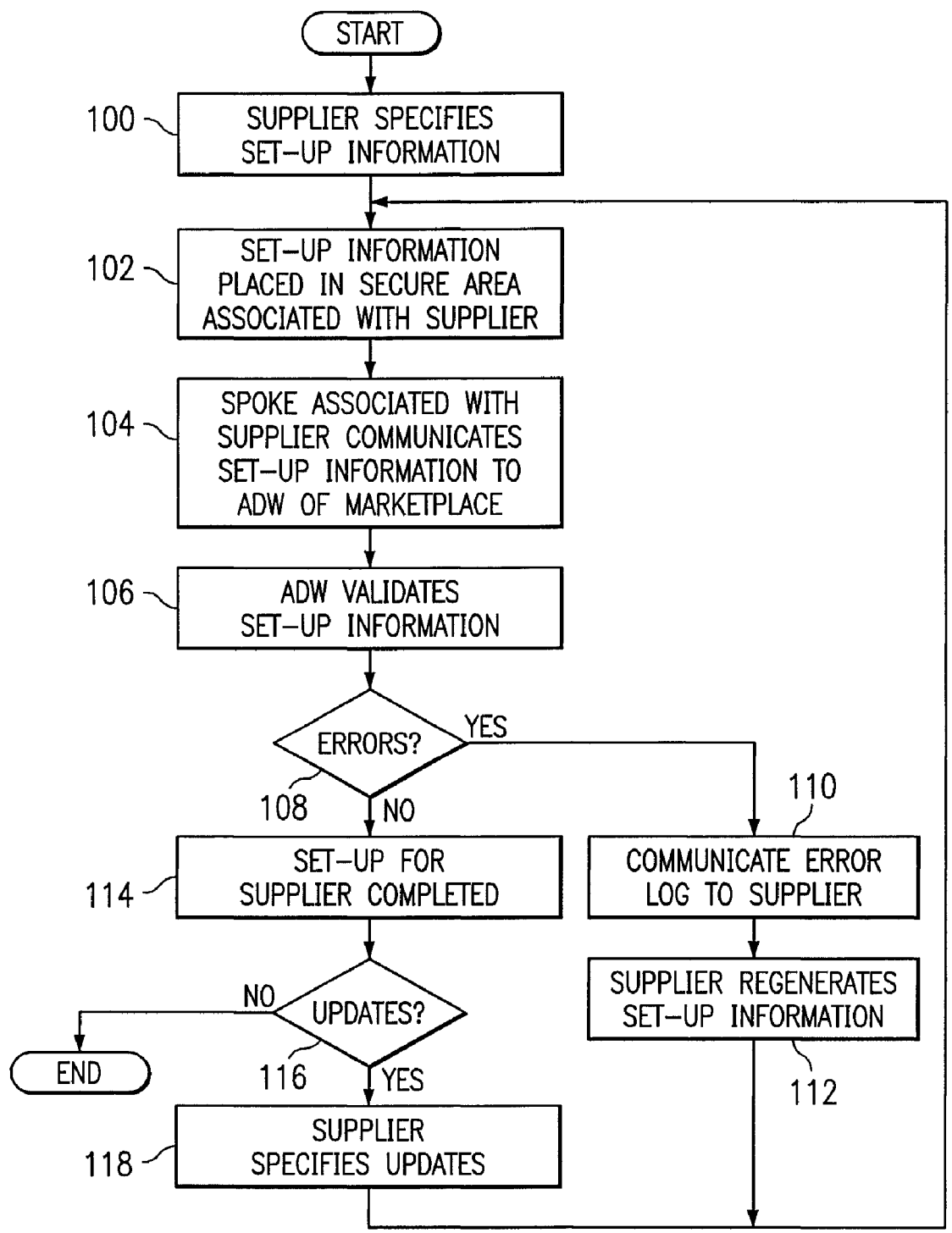

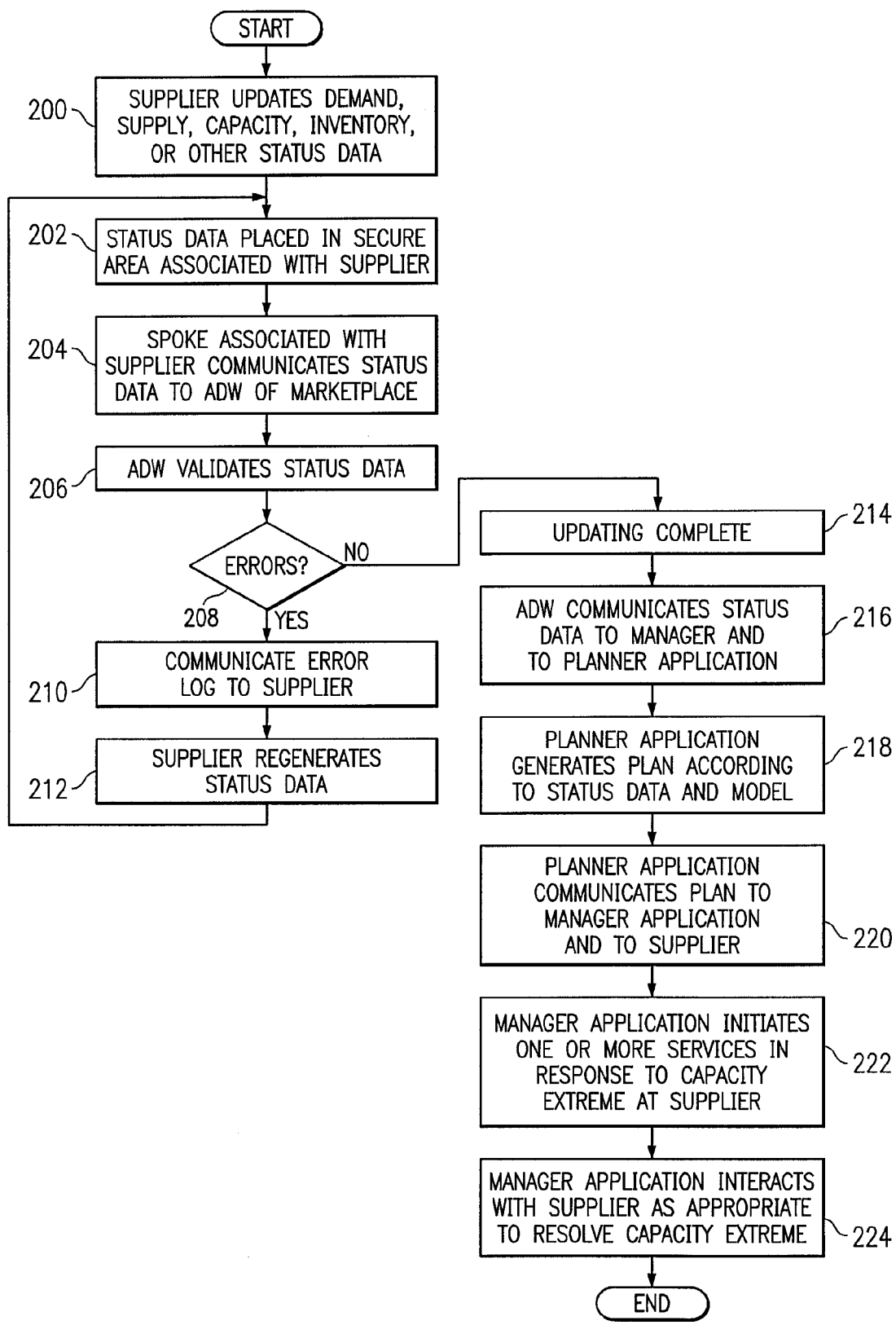

EXTREME CAPACITY MANAGEMENT IN AN ELECTRONIC MARKETPLACE ENVIRONMENT

CLAIM OF PRIORITY

This is a divisional application of U.S. patent application Ser. No. 09/841,320, filed on 23 Apr. 2001 and entitled "EXTREME CAPACITY MANAGEMENT IN AN ELECTRONIC MARKETPLACE ENVIRONMENT", now U.S. Pat. No. 7,370,009, which claims priority under 35 U.S.C. 119(e) to U.S. Provisional Application Ser. No. 60/238,307 filed Oct. 5, 2000 entitled "ELECTRONIC MARKETPLACE PROVIDING EXTREME CAPACITY MANAGEMENT". U.S. Pat. No. 7,370,009 and U.S. Provisional Application Ser. No. 60/238,307 are commonly assigned to the assignee of the present application. The disclosure of related U.S. Pat. No. 7,370,009 and U.S. Provisional Application Ser. No. 60/238,307 are hereby incorporated by reference into the present disclosure as if fully set forth herein.

BACKGROUND

1. Field of the Invention

This invention relates generally to commercial transactions, and more particularly to extreme capacity management in an electronic marketplace environment.

2. Description of Related Art

Companies often experience cycles in which the companies have either excess capacity or under capacity over an extended period. As an example, a manufacturing company may manufacture more products than it has orders for, resulting in an excess capacity situation. Alternatively, a manufacturing company may manufacture too few products to meet its orders, resulting in an under capacity situation. Similar undesirable capacity mismatches may occur with respect to wholesalers, retailers, and other types of companies that must endeavor to match their capacity with demand. Relatively short term excess or under capacity may often be addressed using a factory planner or other planning engine to bring capacity in line with the demand within one or two planning periods. For example, a factory planner may cause a decrease in production in one or more subsequent periods to offset excess capacity in a current period, such that by the end of one or two periods the excess capacity has been eliminated. Alternatively, under capacity in a current period may be addressed through increased production for one or two subsequent periods. Once capacity returns to the desired level, the manufacturing of products may continue as before.

Such techniques often have a number of inadequacies. First, taking a factory as an example, decreasing or increasing production to address capacity issues may require operating the factory under less than optimal conditions. The likely result is increased overhead or other indirect allocation of resources, which negatively impacts the bottom line. Second, although a planning engine may be able to provide notification when the capacity is far above or below what is necessary to match demand, the planning engine will be unable in general to provide a solution for resolving the capacity extreme. The company is left to find an acceptable solution on its own. Doing so typically requires experienced personnel to devote valuable time in finding other companies to accept the excess capacity or provide the under capacity. Even experienced personnel may not be aware of all potential buyers or suppliers or, more importantly, the buyers and suppliers that have compatible capacity at the particular time. These and other deficiencies have made previous techniques for addressing capacity extremes inadequate for the needs of many companies.

SUMMARY OF THE INVENTION

According to the present invention, problems and disadvantages associated with prior techniques for addressing extremes in capacity have been substantially reduced or eliminated.

According to one embodiment of the present invention, a system for managing a capacity extreme at a first entity in a supply chain includes a planning application that receives status data for at least the first entity reflecting the capacity extreme at the first entity and generates a plan according to the status data. A manager application receives the plan and, according to the plan, automatically initiates at least one service in an attempt to resolve at least a portion of the capacity extreme through interaction with one or more other entities. The manager application selects the service from among a plurality of available services based on a monetary value to the first entity of a resolution expected to be available using the selected service relative to other services.

In a more particular embodiment, in response to initiating the service the manager application performs an action to resolve at least a portion of the capacity extreme. The action may include selling items to another entity according to a previously existing contract between the first entity and the other entity, purchasing items from another entity according to a previously existing contract between the first entity and the other entity, selling items to another entity in an auction, purchasing items from another entity in a reverse auction, posting items in a catalog of the first entity for sale to another entity, purchasing items posted in a catalog of another entity, posting items in an inventory listing service for sale to another entity, or purchasing items posted in an inventory listing service by another entity.

In another embodiment of the invention, an electronic marketplace for managing excess or under capacity at one or more enterprises in a supply chain includes a planning application that receives status data for multiple enterprises in the supply chain, the status data reflecting excess or under capacity at a first enterprise in the supply chain. The planning application generates a plan according to the status data for the enterprises and according to a model incorporating the enterprises. A manager application receives the plan and, according to the plan, automatically initiates at least one service in an attempt to resolve at least a portion of the excess or under capacity through interaction with one or more other enterprises. The manager application may select the service from among multiple available services based on a monetary value to the first enterprise of a resolution that is expected to be available using the selected service. The manager application then manages a transfer of items from or to the first enterprise from one or more other enterprises to resolve the excess or under capacity, respectively.

The present invention provides a number of technical advantages over previous techniques. The present invention provides an electronic marketplace solution to allow multiple suppliers and buyers to collaboratively resolve capacity extremes that cannot typically be handled using conventional planned procurement techniques. The present invention helps to optimize supplier operations by providing substantially instantaneous visibility into demand and supply at other members of the value chain and propagating demand and supply throughout the value chain to enable suppliers to off-load or procure items sufficient to resolve excesses and deficits in capacity. The present invention may reduce administrative lead times and allow suppliers such as manufacturers to operate at maximum plant capacity and thus with maximum efficiency and minimum overhead. If capacity extremes are encountered, such manufacturers can compensate rapidly using the intelligent resources of the marketplace. The present invention provides the marketplace with visibility into real constraints and details needed to understand the issues, evaluate alternatives, and facilitate the resolution of capacity extremes.

Systems and methods incorporating one or more of these or other advantages are well suited for modern commercial transaction environments such as those associated with business-to-business ("B2B") electronic marketplaces. Other technical advantages are readily apparent to those skilled in the art from the following figures, descriptions, and claims.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

FIG. 3 illustrates an exemplary method of setting up a system for managing capacity extremes in an electronic marketplace environment; and FIG. 4 illustrates an exemplary method of resolving a capacity extreme at a supplier.

DETAILED DESCRIPTION OF THE PREFERRED EMBODIMENT

Reference will now be made to the following detailed description of the preferred and alternate embodiments of the present invention. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
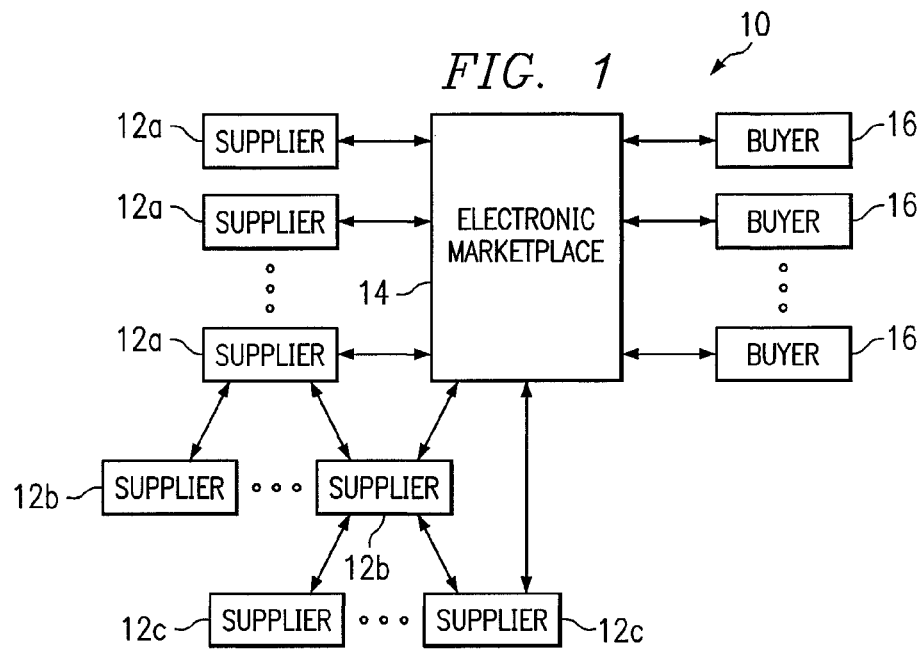
FIG. 1 illustrates an exemplary system for managing capacity extremes in an electronic marketplace environment.

FIG. 1 illustrates an exemplary system 10 for managing capacity extremes associated with one or more suppliers 12 of products or other items. Each supplier 12 may be coupled to a business-to-business (B2B), business-to-consumer (B2C), or other electronic marketplace 14 that links supplier 12 to one or more other suppliers 12 or to buyers 16. As shown, a supplier 12a may be coupled to one or more first tier suppliers 12b which are in turn coupled to one or more second tier suppliers 12c. Depending on the nature of marketplace 14, suppliers 12 may include manufacturers such as original equipment manufacturers (OEMs), component manufacturers or suppliers, distributors, wholesalers, retailers, or any other entities that supply items to other suppliers 12 or to buyers 16 and that may experience excess or under capacity from time to time. The present invention contemplates multiple suppliers 12 that are associated with the same enterprise, for example, multiple factories, assembly lines, or other entities associated with the same manufacturing enterprise. In general, marketplace 14 brokers pertinent data among the suppliers 12 to propagate demand and supply in order to net capacity across the value chain that incorporates suppliers 12. Although extremes of excess or under capacity are primarily described, the present invention encompasses management of any degree of excess or under capacity according to particular needs.

In general, marketplace 14 receives an indication from supplier 12 that supplier 12 is or might soon experience a capacity extreme, determines a suitable resolution for the capacity extreme, and facilitates a transfer of items sufficient to wholly or partially resolve the capacity extreme. For under capacity, the marketplace 14 identifies one or more suppliers 12 from which the needed items may be purchased and facilitates the transfer of the items to supplier 12. For excess capacity, the marketplace 14 identifies one or more other suppliers 12 or buyers 16 to which the excess items may be sold and facilitates transfer of the items to the other supplier 12 or buyer 16. As a result of this activity, capacity extremes may be efficiently and effectively managed without at least some of the deficiencies associated with prior techniques. Features and operation of marketplace 14 are described more fully below. While suppliers 12 and buyers 16 are shown as being coupled to marketplace 14, the present invention contemplates suppliers 12 interacting with one another through one or more first marketplaces 14 and suppliers 12 interacting with buyers 16 using one or more second marketplaces 14. For example, first marketplace 14 may be a purely B2B marketplace 14 and second marketplace 14 may be a purely B2C marketplace 14.

Suppliers 12 and buyers 16 may interact with marketplace 14 autonomously or according to input from one or more associated persons. Suppliers 12, marketplace 14, and buyers 16 may be coupled to one another using one or more local area networks (LANs), metropolitan area networks (MANS), wide area networks (WANs), a portion of the global computer network known as the Internet, or any other appropriate wireline, wireless, or other links. Suppliers 12, marketplace 14, and buyers 16 may be arranged and communicate with one another according to a hub-and-spoke, peer-to-peer, or any other suitable architecture. In one embodiment, system 10 is implemented with a hub-and-spoke architecture in which the spokes are suitably integrated with the enterprise systems of suppliers 12 and buyers 16 and allow schedule-based data transfer between these enterprise systems and marketplace 14. Suppliers 12, marketplace 14, and buyers 16 may each operate on one or more computer systems at one or more locations. The components of system 10 may share data storage, communications, or other resources according to particular needs.

Figure 2:
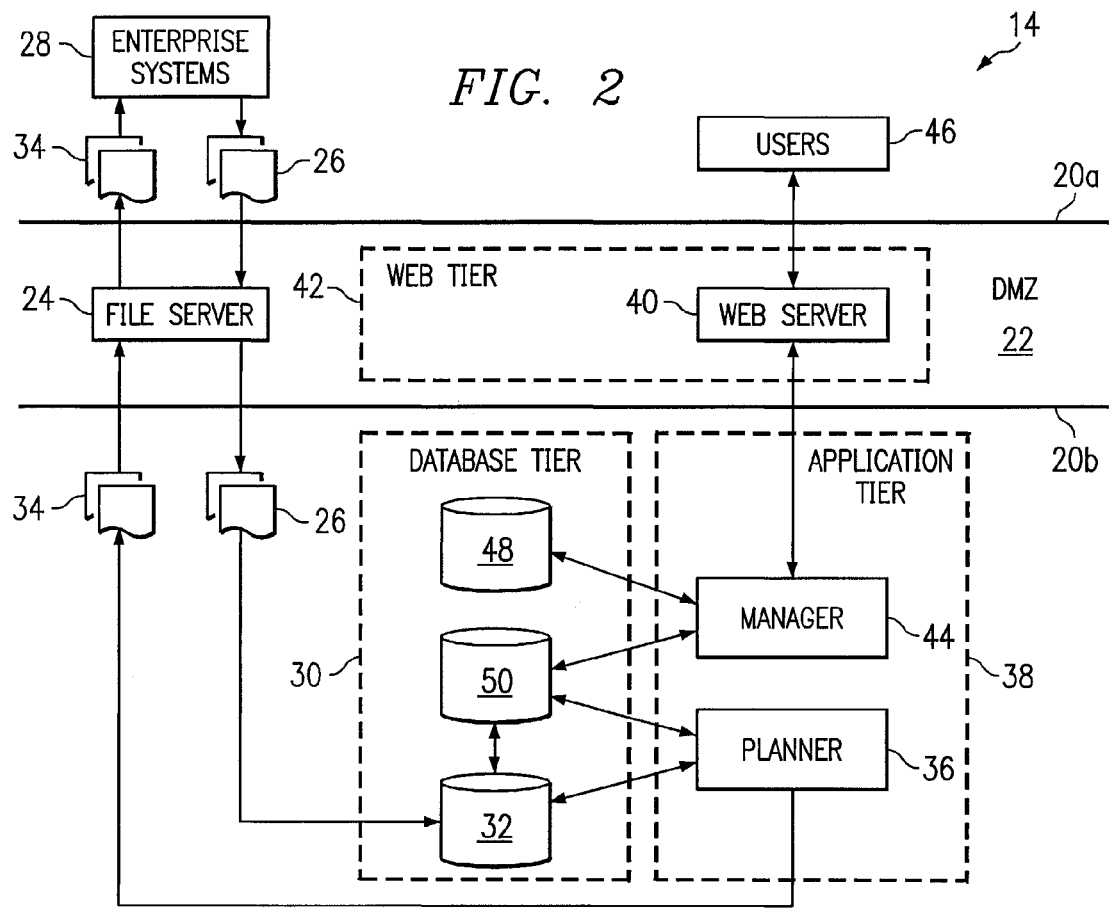
FIG. 2 illustrates an exemplary electronic marketplace.

FIG. 2 illustrates exemplary marketplace 14, and interactions with suppliers 12 and buyers 16, in more detail. Marketplace 14 may include one or more firewalls 20 establishing a "DMZ" or other region 22 that separates suppliers 12 and buyers 16 from certain processing and data storage resources of marketplace 14. In one embodiment, DMZ 22 isolates a file transfer protocol (FTP) or other appropriate file server 24 that receives data files 26 or other information from enterprise systems 28 associated with suppliers 12 and buyers 16. File server 24 communicates the data files 26 to a database tier 30 of marketplace 14 for storage in database 32 in the form of flatfiles or otherwise. File server 24 also receives planning output 34 from one or more appropriate planner applications 36 within an application tier 38 of the marketplace 14. The file server 24 communicates the planning output 34 to enterprise systems 28 associated with suppliers 12. DMZ 22 also isolates one or more web servers 40 within a web tier 42 of the marketplace 14 that communicate between a manager application 44 within application tier 38 and one or more users 46 associated with the suppliers 12 and buyers 16. For example, the web server 40 may communicate with users 46 using Extensible Markup Language (XML) documents contained within Secure Hypertext Transfer Protocol (SHTTP) requests.

In one embodiment, the manager application 44 is responsible for managing the flow of data to, from, and within the marketplace 14 in connection with management of extremes in capacity on behalf of suppliers 12. Based on the planning information it receives from the planner application 36, reflecting at least the capacity situation at the supplier 12 and preferably also the capacity situations at one or more other suppliers 12 and buyers 16, manager application 44 may initiate one or more appropriate services in an attempt to resolve the capacity extreme. In a more particular embodiment, planner application 36 is a supply chain planning engine which generates planning information for some or all of the value chain that contains the supplier 12, other suppliers 12, and buyers 16 based on data files 26 received from enterprise systems 28. In still another more particular embodiment, planner application 36 is a factory planning engine that generates planning information for at least a portion of a factory and its constituent operations. Planner application 36 may interact with database 32 or, more preferably with respect to certain tasks, with an active data warehouse (ADW) 50 in which the information contained in the data files 26 is may be stored and updated. The manager application 44 might also have access to ADW 50 where appropriate. In addition, as described more fully below, manager application 44 may access information stored in database 48 in connection with one or more services it may initiate to resolve capacity extremes. While database 32, database 48, and ADW 50 are described as separate, the present invention contemplates these storage locations being integral to one another, in whole or in part, according to particular needs.

As described above, manager application 44 may initiate one or more suitable services in response to planning information from planner application 36 indicating an extreme capacity situation at supplier 12. Services available to manager application 44 may be identified in database 48, which manager application 44 accesses to determine which of the services to initiate, in which order to initiate the services, and information pertaining to the services. In one embodiment, for under capacity at the supplier 12, manager application 44 may perform one or more of the following, in any appropriate combination and without limitation: (1) purchase some or all needed items from one or more other suppliers 12 according to any existing contracts between the supplier 12 and the other suppliers 12; (2) initiate one or more reverse auctions to purchase some or all needed items from one or more other suppliers 12; (3) purchase some or all needed items from one or more other suppliers 12 according to associated catalogs of these suppliers 12, typically at list price; and (4) purchase some or all needed items from one or more other suppliers 12 according to an inventory listing service (ILS), typically at a discount price.

In one embodiment, for excess capacity at supplier 12, manager application 44 may perform one or more of the following, in any combination and without limitation: (1) sell some or all of the excess items to one or more other suppliers 12 or buyers 16 according to any existing contracts between supplier 12 and the other suppliers 12 or buyers 16; (2) initiate one or more forward auctions to sell some or all excess items to one or more other suppliers 12 or buyers 16; (3) sell some or all excess items to one or more other suppliers 12 or buyers 16 according to the catalog of supplier 12, typically at list price; and (4) sell some or all of the excess items to one or more other suppliers 12 or buyers 16 through an ILS, typically at a discount price. Manager application 44 preferably selects from among all available options to identify one or more options that together satisfy the demand (or relieve the supply) of supplier 12 for the lowest total cost (or highest overall revenue), subject to applicable schedule, delivery, and other constraints. After selecting one or more options, manager application 44 preferably manages, in whole or in part, the associated transactions that are necessary to actually resolve the capacity extreme that exists at supplier 12. The manager application 44 may resolve the capacity extreme substantially automatically in reliance on input from the enterprise systems 28. Manager application 44 may interact with intelligent buying or selling agents associated with the parties to a transaction in resolving the transaction. Manager application 44 may use appropriate input from any users 46 associated with the supplier 12, other suppliers 12, or buyers 16. The present invention contemplates resolving the capacity extreme at supplier 12 in any suitable manner in response to identification of one or more appropriate options at marketplace 14, according to particular needs.

FIG. 3 illustrates an exemplary method of setting up system 10 to manage capacity extremes at one or more suppliers 12. The method begins at step 100, where supplier 12 specifies set-up information for items for which capacity extremes may be managed. As an example, where supplier 12a is an OEM, this set-up information may provide: items for which capacity extremes at supplier 12a are to be managed; any other suppliers 12a that are known to supply or procure the items; any first tier suppliers 12b known to supply the items to supplier 12a; any buyers 16 known to procure the items; information relating to any contracts that might exist between supplier 12a and other suppliers 12a, first tier suppliers 12b, or buyers 16; any other suitable sourcing data; communications information to allow the enterprise systems 28 of the supplier 12a to communicate data files 26 and planning output 34 with marketplace 14; one or more capacity trees; one or more bills of materials (BOMs); suitable mappings between the items supplied to or procured from supplier 12a and items supplied by or procured by, respectively, other entities; and any other suitable set-up information.

For first tier supplier 12b, the set-up information may provide: items for which capacity extremes at supplier 12b are to be managed; any other suppliers 12b known to supply or procure the items; any second tier suppliers 12c known to supply the items to supplier 12b; any suppliers 12a known to procure the items; information concerning any contracts that may exist between the supplier 12b and other suppliers 12b, second tier suppliers 12c or suppliers 12a; any other sourcing data; communications information to allow enterprise systems 28 of supplier 12b to communicate data files 26 and planning output 34 with the marketplace 14; one or more capacity trees; one or more BOMs; mappings between the items supplied to or procured from supplier 12b and the items supplied or procured by, respectively, other entities; and any other appropriate set-up information.

Similarly, for a second tier supplier 12c, set-up information may provide: items for which capacity extremes at supplier 12c are to be managed; any other suppliers 12c known to supply or procure the items; any third tier suppliers 12d known to supply the items to supplier 12c; any suppliers 12b being known to procure the items; information concerning any contracts that may exist between supplier 12c and other suppliers 12c, third tier suppliers 12d or second tier suppliers 12b; other appropriate sourcing data; communications information to allow the enterprise systems 28 of the supplier 12c to communicate data files 26 and planning output 34 with marketplace 14; one or more capacity trees; one or more BOMs; mappings between the items supplied to or procured from the supplier 12c and those items supplied by or procured by, respectively, other entities; and any other appropriate set-up information. Analogous set-up information may be specified for third and lower tiered suppliers 12 or for any other entity within system 10 that is coupled to marketplace 14.

At step 102, the set-up information for supplier 12 is placed in a specified data storage location associated with supplier 12, such as behind a firewall that secures this information against unauthorized access. In a particular embodiment, at step 104, the spoke associated with supplier 12 picks up the set-up information and communicates it over the Internet or otherwise for storage in database 32 and preferably ADW 50. A user 46 may assist in communicating set-up information to marketplace 14, particularly the first time set-up information is communicated for the particular supplier 12. Thereafter, updated set-up information may be automatically communicated by the spoke from the supplier 12 to marketplace 14 on a scheduled basis.

At step 106, ADW 50 may validate one or more suitable aspects of the set-up information. If errors exist at step 108, an error log is generated and communicated to supplier 12 at step 110. In one embodiment, the error log is placed in a specified data storage location associated with supplier 12, such as behind a firewall that secures this information against unauthorized access. At step 112, supplier 12 or an associated user 46 accesses the error log, makes appropriate corrections, and regenerates some or all of the set-up information for the supplier 12. The method then returns to step 102. If no errors exist at step 108, then set-up is complete for supplier 12 at step 114.

If updates to the set-up information are warranted at step 116, supplier 12 or an associated user 46 specifies the updates at step 118 and the method then returns to step 102. The present invention contemplates updating set-up information for a supplier 12 periodically, according to an appropriate schedule, as long as supplier 12 is associated with the marketplace 14. If the supplier 12 disassociates from the marketplace 14 such that no updates occur at step 116, the method ends. The present invention contemplates the method being performed analogously for each supplier 12 or other entity that uses marketplace 14 for managing its capacity extremes or that otherwise participates in the management of capacity extremes at other suppliers 12 or entities.

FIG. 4 illustrates an exemplary method of resolving a capacity extreme at supplier 12 or other entity using the resources of marketplace 14. The method begins at step 200, where supplier 12 and hierarchically related suppliers 12 update their supply, demand, capacity, inventory, or other suitable status data using associated enterprise systems 28. As an example, where supplier 12 is an OEM, supplier 12 may update its demand and inventory status data to reflect excess or under capacity at supplier 12. One or more associated first tier, second tier, and lower tier suppliers 12 may similarly update their supply, capacity, and inventory status data. These updates may occur on a scheduled basis, serially, substantially simultaneously, or in any other appropriate manner. In one embodiment, all suppliers 12 update associated status data according to a predetermined schedule designed to help ensure that the marketplace 14 is not operating on stale data while not imposing an unduly large burden on enterprise systems 28, users 46, or any other aspects of suppliers 12.

At step 202, the status data for each supplier 12 is placed in a specified data storage location associated with supplier 12, such as behind a firewall that protects the information against unauthorized access. In one embodiment, at step 204, the spokes associated with these suppliers 12 pick up the status data and communicate it over the Internet or otherwise to ADW 50 of marketplace 14. Although scheduled automatic communication of the status data is preferable, user 46 may assist in communicating the status data to marketplace 14 as appropriate. At step 206, ADW 50 may validate one or more appropriate aspects of the status data. If errors exist at step 208, an error log is generated and communicated to supplier 12 at step 210. In one embodiment, the error log is placed in a specified data storage location associated with supplier 12, such as behind a firewall that secures the information from unauthorized access. At step 212, supplier 12 or an associated user 46 accesses the error log, makes suitable corrections, and regenerates some or all set-up information for the supplier 12. The method then returns to step 102. If no errors exist at step 208, then updating of the status data is complete for supplier 12 at step 214.

At step 216, ADW 50 communicates the status data for one or more suppliers 12 to planner application 36 and, possibly, to manager application 44. Based on the status data and an appropriate model for at least the portion of the value chain containing the supplier 12, planning application 36 generates an updated plan at step 218. Although supplier 12 and its associated value chain are primarily described, as noted above the present invention contemplates planning for any suitable collection of entities, such as multiple factories of a single enterprise or multiple operations within a single factory. Planning application 36 then communicates the plan to manager application 44 and to enterprise systems 28 of supplier 12 at step 220.

In response, at step 222, manager application 44 initiates one or more suitable services in an effort to resolve the capacity extreme at supplier 12. As described more fully above, depending on the nature of the capacity extreme, manager application 44 may rely on existing contracts between the supplier 12 and other entities, initiate one or more reverse or regular auctions, use catalogs, use an ILS, or initiate any other suitable service according to particular needs. At step 224, the manager application 44 interacts with supplier 12, its enterprise systems 28, or its associated users 46 as appropriate to resolve the extreme in capacity. Manager application 44 may similarly interact with one or more other suppliers 12 or other entities involved in resolving the capacity extreme, depending on the selected service and the capabilities of the marketplace 14. Once the capacity extreme has been adequately resolved, the method ends.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system of electronic marketplace management of excess or under capacity at one or more enterprises in a supply chain, comprising:

a planning application that receives status data of a plurality of enterprises in the supply chain, the status data reflecting excess or under capacity at a first enterprise in the supply chain, the planning application generates a plan according to the status data of the plurality of enterprises in the supply chain and further according to a model incorporates the plurality of enterprises in the supply chain; and a manager application that receives the plan and, according to the plan, automatically initiates at least one service in an attempt to resolve at least a portion of the excess or under capacity through interaction with one or more other enterprises, the manager application selects the service from among a plurality of available services based on a monetary value to the first enterprise of a resolution expected to be available using the selected service, the manager application further manages transfer of items from or to the first enterprise from one or more other enterprises to resolve the excess or under capacity, respectively.

2. The system of claim 1, wherein the status data comprises data selected from the group consisting of:
   demand data;
   supply data;
   inventory data; and
   capacity data.

3. The system of claim 1, wherein the manager application, in response to initiating the service, performs an action to resolve at least a portion of the excess or under capacity, the action selected from the group consisting of:
   sell items to another entity according to a previously existing contract between the first entity and the other entity;
   purchase items from another entity according to a previously existing contract between the first entity and the other entity;
   sell items to another entity in an auction;
   purchase items from another entity in a reverse auction;
   post items in a catalog of the first entity for sale to another entity;
   purchase items posted in a catalog of another entity;
   post items in an inventory listing service for sale to another entity; and
   purchase items posted in an inventory listing service by another entity.

4. The system of claim 1, wherein the manager application initiates multiple services to attempt to resolve the excess or under capacity, a first service initiated to attempt to resolve a first portion of the excess or under capacity and a second service initiated to attempt to resolve a second portion of the excess or under capacity.

5. A computer-implemented method of managing a capacity extreme at a first entity in a supply chain, comprising:
   receiving, by a computer, status data of at least the first entity reflecting the capacity extreme at the first entity;
   automatically generating, by the computer, a plan according to the status data and according to a model incorporating at least a portion of a supply chain that includes the first entity, the status data reflecting capacity extreme at the first entity in the supply chain; and
   according to the plan, automatically initiating, by the computer, at least one service in an attempt to resolve at least a portion of the capacity extreme through interaction with one or more other entities, the service selected from among a plurality of available services based on a monetary value to the first entity of a resolution expected to be available using the selected service relative to other services.

6. The method of claim 5, wherein the first entity is a first enterprise and the plan is a supply chain plan of at least a portion of the supply chain containing the first enterprise.

7. The method of claim 5, wherein the status data comprises data selected from the group consisting of:
   demand data;
   supply data;
   inventory data; and
   capacity data.

8. The method of claim 5, wherein the capacity extreme is selected from the group consisting of excess capacity and under capacity.

9. The method of claim 5, further comprising receiving status data from one or more other entities in the supply chain, the plan generated according to all of the status data for the supply chain.

10. The method of claim 5, wherein the plan is generated further according to a model incorporating at least the first entity.

11. The method of claim 5, further comprising, in response to initiating the service, performing an action to resolve at least a portion of the capacity extreme, the action selected from the group consisting of:
   sell items to another entity according to a previously existing contract between the first entity and the other entity;
   purchase items from another entity according to a previously existing contract between the first entity and the other entity;
   sell items to another entity in an auction;
   purchase items from another entity in a reverse auction;
   post items in a catalog of the first entity for sale to another entity;
   purchase items posted in a catalog of another entity;
   post items in an inventory listing service for sale to another entity; and
   purchase items posted in an inventory listing service by another entity.

12. The method of claim 5, further comprising initiating multiple services to attempt to resolve the capacity extreme, a first service initiated in an attempt to resolve a first portion of the capacity extreme and a second service initiated in an attempt to resolve a second portion of the capacity extreme.

13. The method of claim 5, further comprising interacting with the other entities automatically to resolve the capacity extreme according to the plan.

14. A computer-readable medium having encoded theron software when executed by a computer that manages a capacity extreme at a first entity in a supply chain, the software comprising instructions to:
   receive status data of at least the first entity reflecting the capacity extreme at the first entity;
   automatically generate a plan according to the status data and according to a model incorporating at least a portion of a supply chain that includes the first entity, the status data reflecting capacity extreme at the first entity in the supply chain; and
   according to the plan, automatically initiate at least one service in an attempt to resolve at least a portion of the capacity extreme through interaction with one or more other entities, the service selected from among a plurality of available services based on a monetary value to the first entity of a resolution expected to be available using the selected service relative to other services.

15. The computer-readable medium of claim 14, wherein the first entity is a first enterprise and the plan is a supply chain plan of at least a portion of the supply chain containing the first enterprise.

16. The computer-readable medium of claim 14, wherein the status data comprises data selected from the group consisting of:
   demand data;
   supply data;
   inventory data; and
   capacity data.

17. The computer-readable medium of claim 14, wherein the capacity extreme is selected from the group consisting of excess capacity and under capacity.

18. The computer-readable medium of claim 14, wherein the software further comprises instructions to receive status data from one or more other entities in the supply chain, the plan generated according to all of the status data of the supply chain.

19. The computer-readable medium of claim 14, wherein the plan is generated further according to a model incorporating at least the first entity.

20. The computer-readable medium of claim 14, wherein the software further comprises instructions to, in response to initiating the service, perform an action to resolve at least a portion of the capacity extreme, the action selected from the group consisting of:
   sell items to another entity according to a previously existing contract between the first entity and the other entity;
   purchase items from another entity according to a previously existing contract between the first entity and the other entity;
   sell items to another entity in an auction;
   purchase items from another entity in a reverse auction;
   post items in a catalog of the first entity for sale to another entity;
   purchase items posted in a catalog of another entity;
   post items in an inventory listing service for sale to another entity; and
   purchase items posted in an inventory listing service by another entity.

21. The computer-readable medium of claim 14, wherein the software further comprises instructions to initiate multiple services to attempt to resolve the capacity extreme, a first service initiated in an attempt to resolve a first portion of the capacity extreme and a second service initiated in an attempt to resolve a second portion of the capacity extreme.

22. The computer-readable medium of claim 14, wherein the software further comprises instructions to interact with the other entities automatically to resolve the capacity extreme according to the plan.

23. A computer-implemented method of managing excess or under capacity at one or more enterprises in a supply chain, comprising
   receiving, by a computer, status data of a plurality of enterprises in the supply chain, the status data reflecting excess or under capacity at a first enterprise in the supply chain;
   accessing, by the computer, a model incorporating the plurality of enterprises in the supply chain;
   generating, by the computer, a plan according to the status data of the plurality of enterprises in the supply chain;
   automatically initiating, by the computer, at least one service in an attempt to resolve at least a portion of the excess or under capacity through interaction with one or more other enterprises;
   selecting, by the computer, the service from among a plurality of available services based on a monetary value to the first enterprise of a resolution expected to be available using the selected service; and
   managing, by the computer, transfer of items from or to the first enterprise from one or more other enterprises to resolve the excess or under capacity, respectively.

24. The method of claim 23, wherein the status data comprises data selected from the group consisting of:
   demand data;
   supply data;
   inventory data; and
   capacity data.

25. The method of claim 23, further comprising, in response to initiating the service, performing an action to resolve at least a portion of the excess or under capacity, the action selected from the group consisting of:
   sell items to another entity according to a previously existing contract between the first entity and the other entity;
   purchase items from another entity according to a previously existing contract between the first entity and the other entity;
   sell items to another entity in an auction;
   purchase items from another entity in a reverse auction;
   post items in a catalog of the first entity for sale to another entity;
   purchase items posted in a catalog of another entity;
   post items in an inventory listing service for sale to another entity; and
   purchase items posted in an inventory listing service by another entity.

26. The method of claim 23, further comprising:
   initiating multiple services to attempt to resolve the excess or under capacity, a first service initiated to attempt to resolve a first portion of the excess or under capacity and a second service initiated to attempt to resolve a second portion of the excess or under capacity.

27. A computer-readable medium having encoded theron software when executed by a computer that manages excess or under capacity at one or more enterprises in a supply chain, the software comprising instructions to:
   receive status data of a plurality of enterprises in the supply chain, the status data reflecting excess or under capacity at a first enterprise in the supply chain;
   access a model incorporating the plurality of enterprises in the supply chain;
   generate a plan according to the status data of the plurality of enterprises in the supply chain;
   automatically initiate at least one service in an attempt to resolve at least a portion of the excess or under capacity through interaction with one or more other enterprises;
   select the service from among a plurality of available services based on a monetary value to the first enterprise of a resolution expected to be available using the selected service; and
   manage transfer of items from or to the first enterprise from one or more other enterprises to resolve the excess or under capacity, respectively.

28. The computer-readable medium of claim 27, wherein the status data comprises data selected from the group consisting of:
   demand data;
   supply data;
   inventory data; and
   capacity data.

29. The computer-readable medium of claim 27, wherein the software further comprises instructions to, in response to initiating the service, perform an action to resolve at least a portion of the excess or under capacity, the action selected from the group consisting of:
   sell items to another entity according to a previously existing contract between the first entity and the other entity;

purchase items from another entity according to a previously existing contract between the first entity and the other entity;

sell items to another entity in an auction;

purchase items from another entity in a reverse auction;

post items in a catalog of the first entity for sale to another entity;

purchase items posted in a catalog of another entity;

post items in an inventory listing service for sale to another entity; and purchase items posted in an inventory listing service by another entity.

30. The computer-readable medium of claim 27, wherein the software further comprises instructions to initiate multiple services to attempt to resolve the excess or under capacity, a first service initiated to attempt to resolve a first portion of the excess or under capacity and a second service initiated to attempt to resolve a second portion of the excess or under capacity.

* * * * *